(12) United States Patent
Veiga Leal et al.

(10) Patent No.: US 7,644,816 B2
(45) Date of Patent: Jan. 12, 2010

(54) GRAIN SAVING, DIRECTABLE UNLOADER BOOT ASSEMBLY

(75) Inventors: Jose Luiz Veiga Leal, Paraná (BR); Jay D. Schroeder, Coal Valley, IL (US); Bryan B. Finley, Bettendorf, IA (US); Luiz G. Junges, Paraná (BR)

(73) Assignee: CNH America LLC, New Holland, PA (US)

( * ) Notice: Subject to any disclaimer, the term of this patent is extended or adjusted under 35 U.S.C. 154(b) by 92 days.

(21) Appl. No.: 12/150,674

(22) Filed: Apr. 30, 2008

(65) Prior Publication Data

US 2009/0272619 A1 Nov. 5, 2009

(51) Int. Cl.
*B65G 33/14* (2006.01)
*B65G 33/22* (2006.01)

(52) U.S. Cl. .................... 198/671; 193/22; 56/16.6
(58) Field of Classification Search ............. 198/671; 193/22; 56/16.6; 406/161, 164, 180
See application file for complete search history.

(56) References Cited

U.S. PATENT DOCUMENTS

| | | | | |
|---|---|---|---|---|
| 80,880 | A | * 8/1868 | Wright | 37/366 |
| 804,511 | A | * 11/1905 | Winters | 285/264 |
| 1,721,258 | A | 7/1929 | Payne | |
| 1,885,656 | A | 11/1932 | Wallace | |
| 2,456,744 | A | * 12/1948 | Sjoberg | 285/261 |
| 2,625,001 | A | 1/1953 | Heun | 56/373.5 |
| 3,447,669 | A | 6/1969 | Mayrath | 198/213 |
| 3,575,306 | A | * 4/1971 | Obermeyer et al. | 414/523 |
| 3,722,715 | A | 3/1973 | Young | 214/17 D |
| 3,815,781 | A | 6/1974 | Armstrong et al. | 221/75 |
| 3,963,112 | A | 6/1976 | Crego | 198/72 |
| 4,164,327 | A | 8/1979 | Clark | 239/669 |
| 4,881,855 | A | 11/1989 | Rempel et al. | 406/53 |
| 4,988,240 | A | * 1/1991 | Thompson | 406/166 |
| 5,167,581 | A | 12/1992 | Haag | 460/114 |
| 5,343,995 | A | * 9/1994 | Scarrow | 198/311 |
| 5,348,138 | A | 9/1994 | Seemann | 198/167 |
| 5,538,388 | A | 7/1996 | Bergkamp et al. | 414/523 |
| 6,296,435 | B1 | * 10/2001 | Wood et al. | 414/523 |
| 6,591,974 | B2 | 7/2003 | Tofin et al. | 198/671 |
| 6,691,861 | B2 | 2/2004 | Reimer et al. | 198/534 |
| 6,974,021 | B1 | 12/2005 | Boevers | 198/550.2 |

FOREIGN PATENT DOCUMENTS

| | | |
|---|---|---|
| JP | 10215663 | 8/1998 |
| JP | 11187753 | 7/1999 |

OTHER PUBLICATIONS

Biomass Magazine article from Sep. 2007, entitled Nebraska Corncob Harvesters.

* cited by examiner

*Primary Examiner*—Mark A Deuble
(74) *Attorney, Agent, or Firm*—Michael G. Harms; John William Stader; Patrick M. Sheldrake (57) ABSTRACT

A pivoting boot is disclosed for attachment to the unloading auger tube of combine harvesters, and serves as both a grain saving dam against unwanted grain spillage, and a directable spout. The boot permits evenly unloading grain onto, or completely filling, transportation vehicles or storage containers, without having to change the combine position, once it is staged for unloading.

14 Claims, 7 Drawing Sheets

GRAIN SAVING, DIRECTABLE UNLOADER BOOT ASSEMBLY

TECHNICAL FIELD

The present invention relates to unloading grain, from the auger tube of a combine harvester, into a storage facility or a transporting truck, wagon, or other vehicle. It particularly relates to a grain saving boot assembly for the auger tube, and a dribble-proof method for directionally unloading grain, from the auger tube, when deploying the boot.

BACKGROUND ART

Unloading of grain from combine harvester storage bins, by way of an auger discharging said grain through a tube and spout, has had, inter alia, two continuing inefficiencies over the years, i.e. directability and spillage by dribbling.

First, when loading grain onto, for example, the bed of a truck, from an auger, generally the truck must be positioned so that the downspout of the auger tube is centered in relationship to the bed of the truck. Otherwise, the maximum amount of grain cannot be loaded onto the truck without subsequent maneuvering of one or the other vehicles. That is, if the combine is mis-positioned, the grain will not flow evenly onto the truck bed, hence, less than the optimal amount of grain is available for transport on the missed side of the truck bed. When grain unloads onto a truck, preferably it disperses evenly over the entire bed of the truck.

It is possible, of course, to move either the truck in relationship to the auger spout, or to move the combine so as to accurately place the auger tube over the truck bed. However, to do so has become more difficult over the years as the auger tubes have grown longer and longer, in order to keep pace with the ever-increasing width of modern day combine headers, which are now as wide as 42 feet or more. Many attempts have been made, in the art, to attach an assembly to the auger tube in an effort to adjust the direction of the discharge. Most of these prior art devices have been overly complicated, requiring many moving parts and complex operations. Others have been simple and are either ineffective or require time-consuming, manual adjustments such as certain elongated spout attachments that are unduly sensitive to movement and difficult to control. The complex operation, complexity of assembly, and/or complexity of disassembly, or the ineffectiveness have inhibited the devices from widespread commercial acceptance and/or the time-consuming methods for using them dissuaded their implementation.

For example, U.S. Pat. No. 2,625,001, entitled Grain Unloading Attachment, issued Jan. 13, 1953, to R. G. Huen, disclosed a mechanical spout that pivoted at the distal end of a grain unloading tube. The spout was not secure. Furthermore, the spout was not adjustable, except by hand, which would require operators to climb up and adjust it for every change in angle desired during unloading of the feed.

U.S. Pat. No. 5,167,581, entitled Directable Spout For A Conveyor, issued Dec. 1, 1992, to Steve Haag, disclosed a means for directing grain being discharged from an auger tube directly down through a trapezoidal funnel which incorporated a deflection plate to change the angle of discharge of the grain being unloaded from the auger. The hinges for the pivot plate were located within the pattern of flow of the grain and therefore were difficult to maintain, thus incurring damage and clogging. The deflection plate was unstable. Additionally, like other systems for directing the discharge, there was no means to save grain from dribbling, inadvertently, out of the end of the auger after the unloading was disengaged. Finally, the grain discharge would lose velocity as it flowed through the open funnel, thus losing efficiency.

U.S. Pat. No. 6,974,021, entitled Adjustable Grain Spout Assembly, issued Dec. 13, 2005, to Craig Boevers, disclosed a complex pivot spout assembly with many complicated attachments and parts which led to more frequent breakdown and damage.

A second unloading problem in addition to the directability of the grain discharge, is that of dribbling grain. Combine augers normally retain a small amount of grain in the housing or spout of the auger or tube surrounding the auger, after the unloading cycle is completed. The grain retained in the auger tends to slowly dribble out of the auger as the combine is transported in the field or along a road. Such loss is expensive and unsightly. Attempts to solve the problem have included shutters, doors, valves, etc. which have ancillary moving parts and extraneous components which add even more expense to the combine unloader. Examples of such dribble-proof doors were disclosed in U.S. Pat. No. 6,691,861, issued Feb. 17, 2004, to Mark J. Reimer, et al.

There have also existed spring-loaded flaps located inside the auger tube. Such anti-dribbling spring-biased members were designed to release and lower when the auger discharge begins, while springing back to a closed position after the discharge ceased. The problem is that such spring loaded impingements are not strong enough to hold grain residue over time, and tend to inadvertently release and allow grain to dribble out when weakened.

It would be a surprising advancement in the art if there were provided a means by which the combine operator could selectively direct the output of the combine unloading auger, so that precise location between the combine and the transport vehicle is not required, while nevertheless having a minimal number of moving parts, little expense, an infrequent need for maintenance or repairs, and while also having integral to such means having therein an anti-dribble capability that prevented inadvertent loss of grain through the auger tube.

SUMMARY OF THE INVENTION

In the present invention, a discharge boot is pivotably attached at the distal end of a combine auger unloading tube to direct grain as it exits the unloader tube. This pivotable discharge boot matingly and hingedly interfaces the distal end of the unloader tube via a spherical joint element that also seals the junction between the tube and the boot. The directional movement of the boot is controlled by an actuator such as a piston and cylinder linkage. The actuator is controlled by inputs from, for example, inside an operator's cab. In the process of the invention, the combine operator turns the unloading system off, and simultaneously, the discharge boot, having its pivotal movement synchronized with the activation of the auger discharge function, will instantly pivot up and act as a "grain saver", preventing inadvertent grain spillage. When the operator engages the unloading system to initiate the auger, the discharge boot will automatically pivot down from its "grain save" position to its "nominal" operating position. While the auger is engaged and moving, the combine operator can manually adjust the position of the discharge boot up or down, in an infinite number of angles, diverging from the "nominal" position. The operator may use any input device such as a switch, button, lever, etc. on a console or, for example, integral to a propulsion handle. When the operator disengages the auger, the discharge boot automatically rotates up into the "grain save" position. Then, the unloader tube may be swung, from its unloading position, which is transverse to direction of the combine, back to its storage position which is in parallel or longitudinal relationship to the front-to-back direction of the combine.

DETAILED DESCRIPTION OF THE INVENTION

Figure 1:
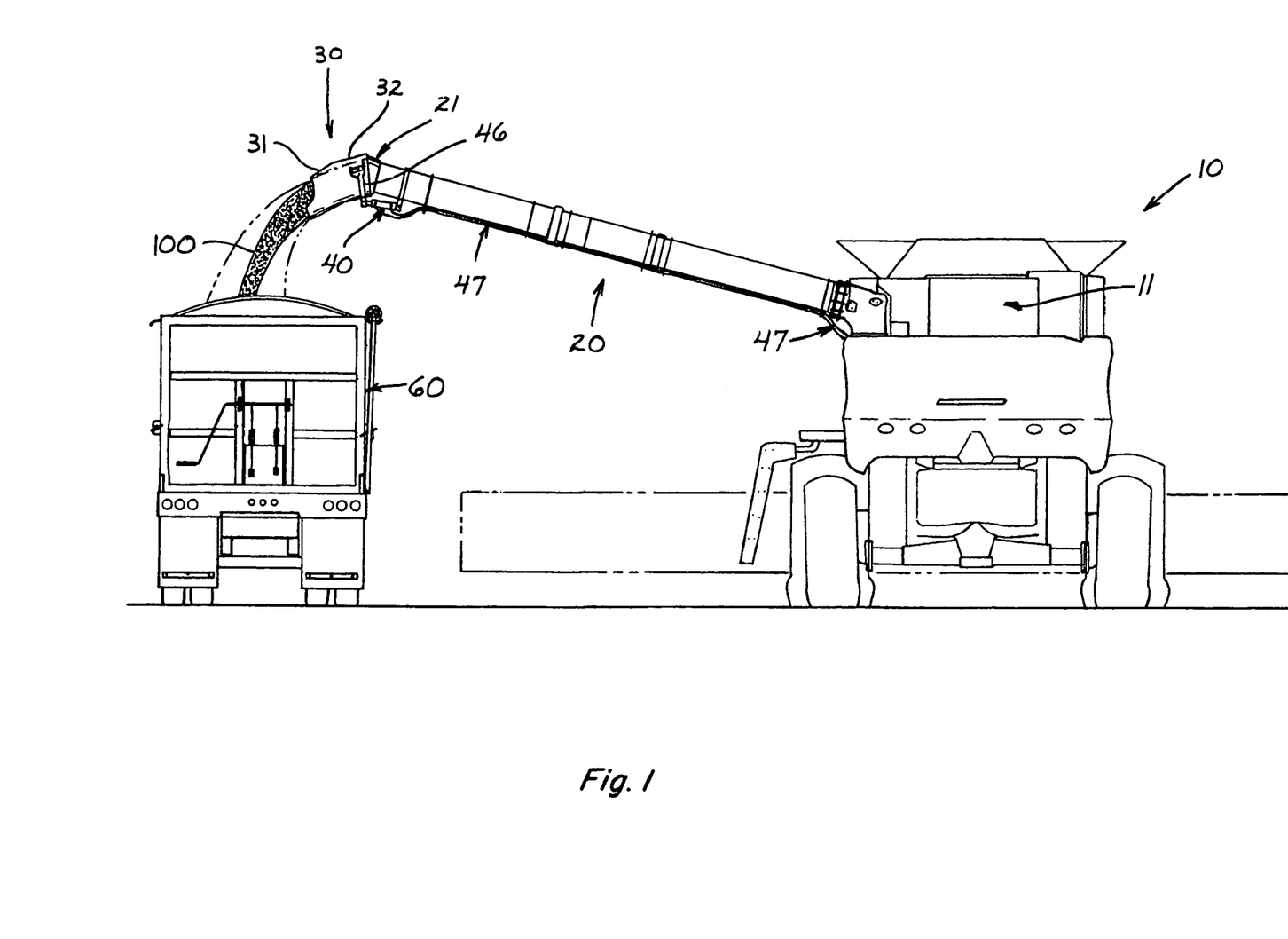
FIG. 1 is a rear end view of a combine showing grain unloading from an auger tube into a truck.

Referring now to FIG. 1, combine harvester 10 has its unloading auger tube 20 transversely extending and fully deployed as it unloads grain 100 through discharge boot 30 and into bed of truck 60. Boot 30 can have any convenient shape. Preferably, it is generally cylindrical, but can be more boxy with edges, or venturi-shaped, etc. The opening of auger tube 20 at its distal end is peripherally sealed by a joint member 21 which hingedly engages portion 32 of boot 30, which portion 32 interfaces the distal end of the auger tube 20. The joint member is preferably rounded or spherical, but can be cylindrical on a horizontal axis, so long as the interface between the tube 20 and boot 30 is adequately sealed. Angularly extending from portion 32 of boot 30 is spout end 31 of the boot. Signals from cab 11 of combine harvester 10, travel through conduits 47 for controlling an actuator 40, which actuator 40 pivotally moves boot 30 in hinging relationship to the unloading auger tube 20, via spherical joint 21. Joint 21 also serves to seal the interface at end 32 of boot 30.

Figure 2:
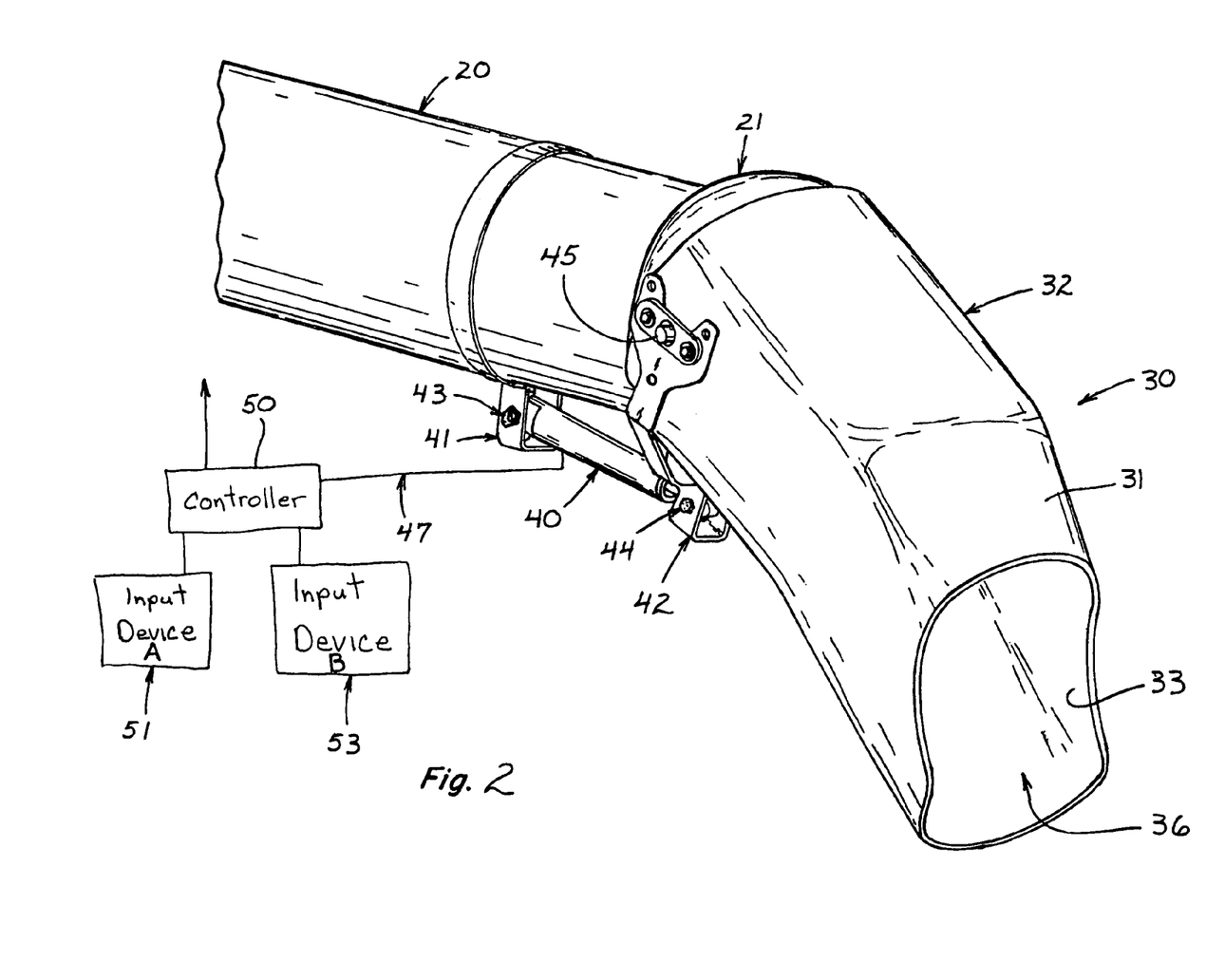
FIG. 2 is a perspective view of the directable discharge boot of the present invention.

As diagrammed at FIG. 2, buttons, switches, levers and other input devices for engaging and disengaging the on-off function of the auger may be designated at 51. Devices for controlling the deployment of the tube 20 and pivoting of boot 30 may be designated at 53. Both input devices are preferably located in the cab 11 of the combine harvester 10 and are programmed through controller 50. As is more readily apparent from FIG. 2, boot 30 and unloading auger tube 20 have their hinging relationship manifested via pivot points at 41 on the tube, 42 on the lower end of the boot, and 45 on the upper end of the boot. Preferably there is an additional upper pivot point matingly connected via bracket 42 but on the outside wall (not shown) of boot 30. Between pivot points 43 and 44 is connected an actuator 40 and supported by brackets 41 and 42, fixed at the tube 20 and the boot 30 respectively. The actuator 40 is preferably a piston and cylinder type actuator, but optionally can be either an electronic, a pneumatic, or an hydraulic device, as desired.

Figure 3:
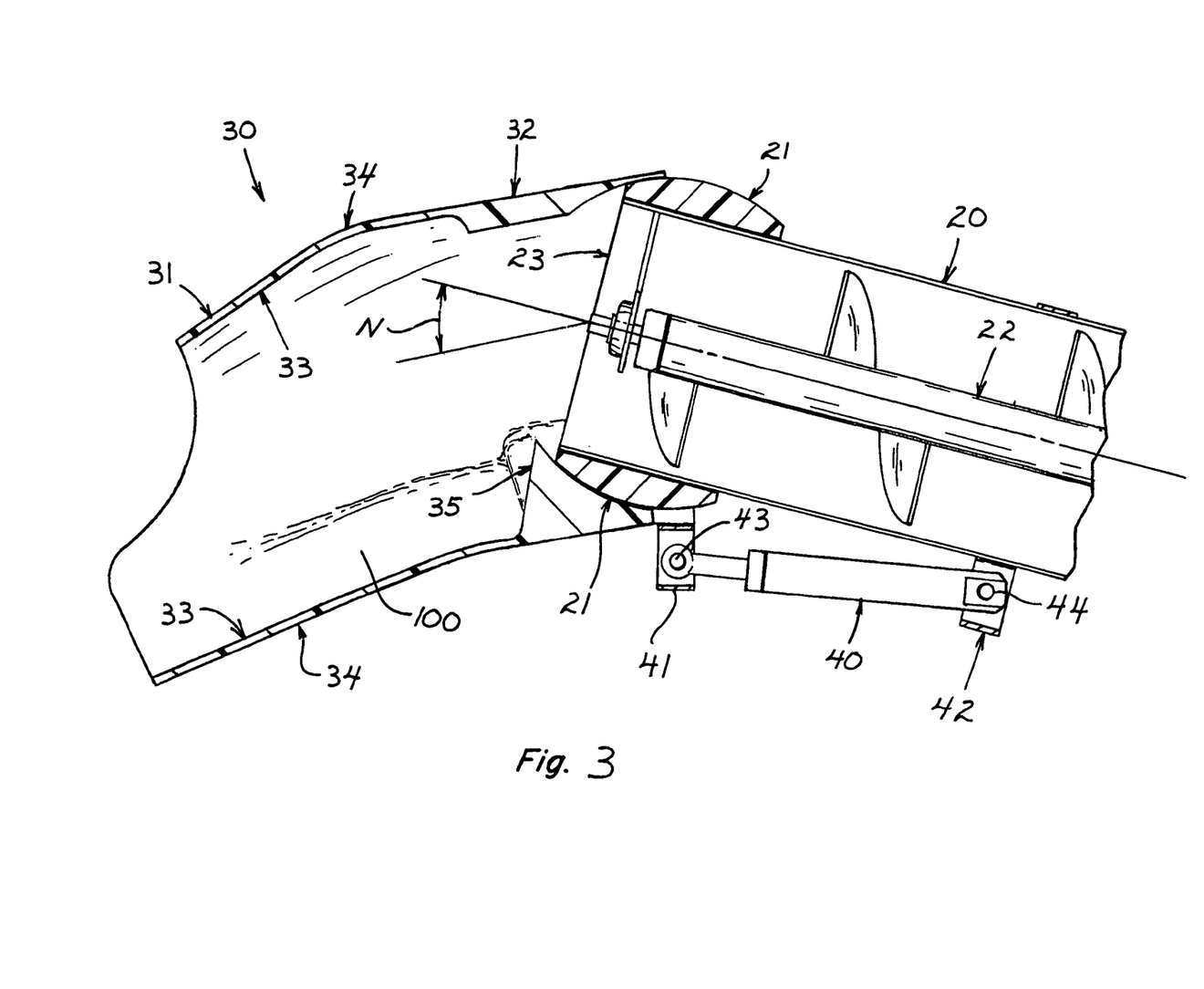
FIG. 3 is a partially cutaway view of the discharge boot and distal end of the unloading auger tube with the boot at its "nominal" angle.
Figure 4:
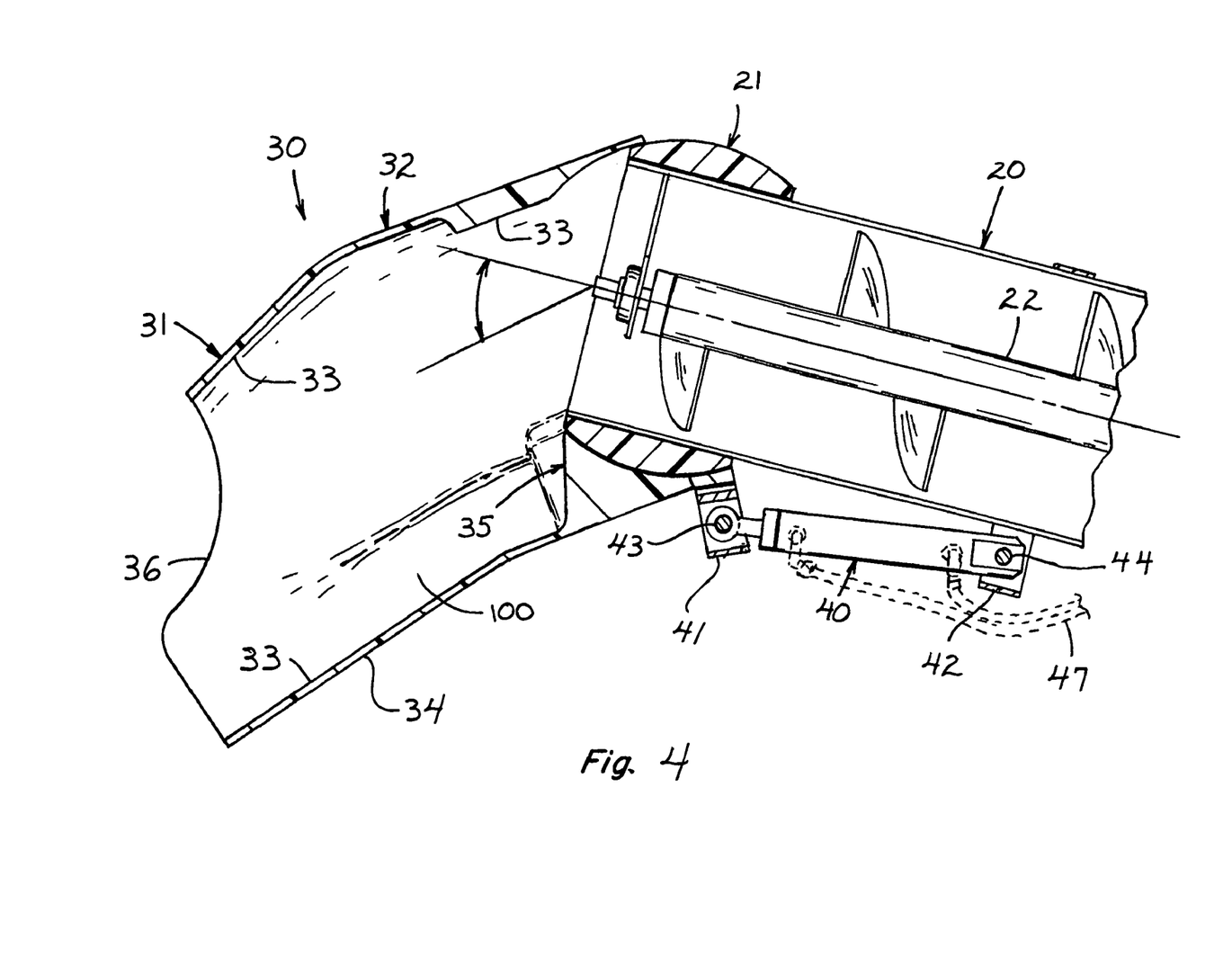
FIG. 4 is a side elevational view of a partially cutaway cross-sectional view of the boot and the interface between it and the distal end of an unloading auger tube at its steepest angle down.

Referring now to FIG. 3, it can be seen that boot 30 is defined by angularly disposed portions 31 and 32. Portion 32 is the portion of boot 30 which interfaces with tube 20 and matingly engages spherical joint 21, allowing opening 23, at the distal end of tube 20, to unload grain 100 traveling via the movement of auger 22 and discharging through boot 30. Boot 30 is a hollow boot defined by outer walls 34 and inner walls 33. Inner wall 33 is configured or shaped to define, at its lower portion, a dam impingement 35, which slidingly moves along the lower portion of spherical joint 21 as boot 30 pivots. The surface shape of dam impingement 35 is in conformity with the surface topography of the spherical joint 21. Boot 30 and its dam 35 are depicted in FIG. 3 at a "nominal" position vis-à-vis angle N. In FIG. 4, it can be seen that dam 35 slides further underneath the interface of tube 20 along the lower surface of spherical joint 21 as the boot 30 is pivoted down from its "nominal" angle (N) to now reflect a steeper, if not the most steep angle D.

Figure 5:
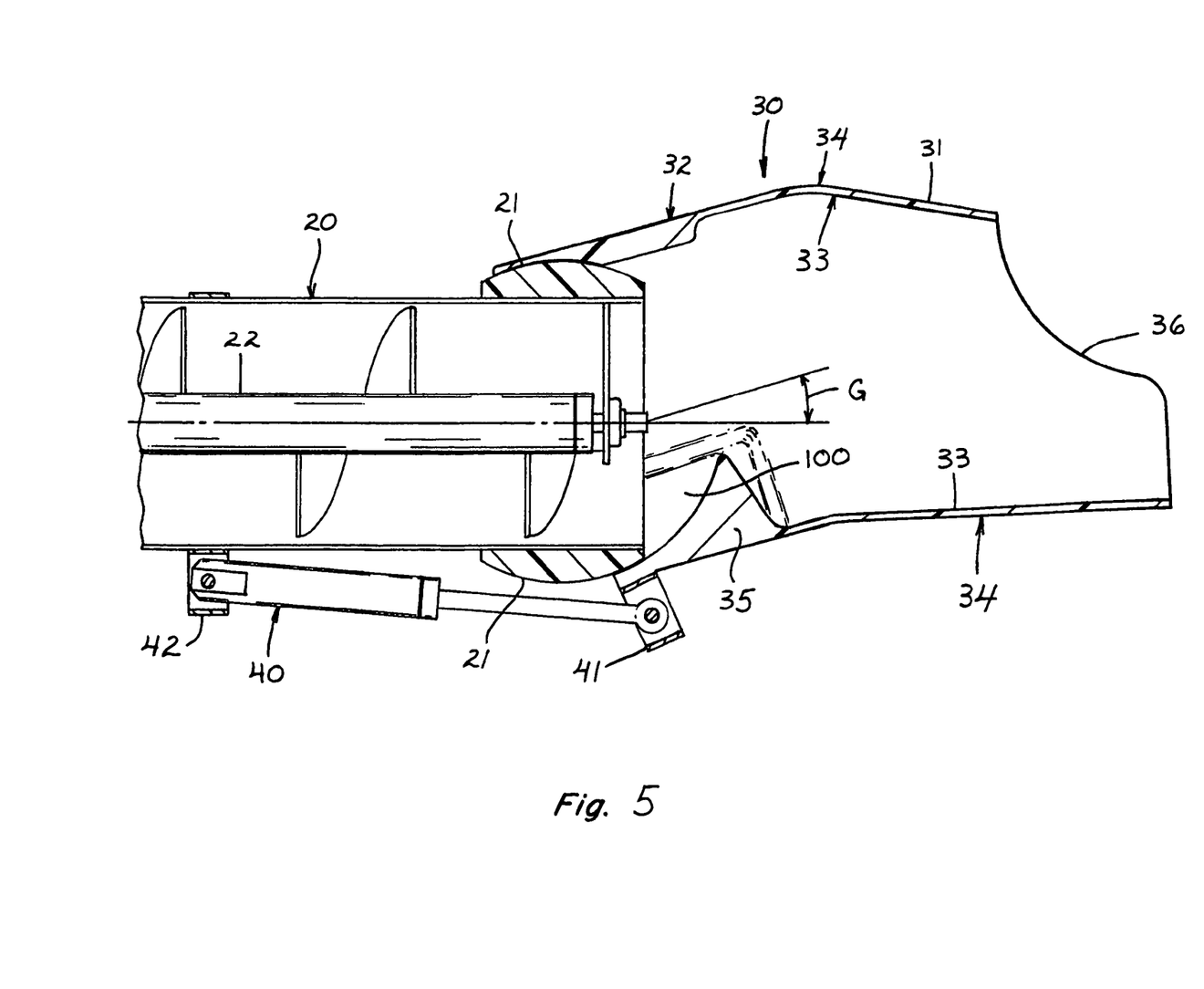
FIG. 5 is a partially cutaway cross-sectional view of the boot of the present invention and its interface with the distal end of the auger unloading tube when the boot is at the "grain save" position and the tube has swung back to its storage position.

In FIG. 5 the position of boot 30 in relationship to tube 20 is shown at a point and time when the boot has been pivoted up above horizontal into the angle G which is the "grain save" position. In the "grain save" (G) position, grain 100, as a consequence of dam impingement 35, is inhibited from spilling out of spout open end 36.

Figure 6:
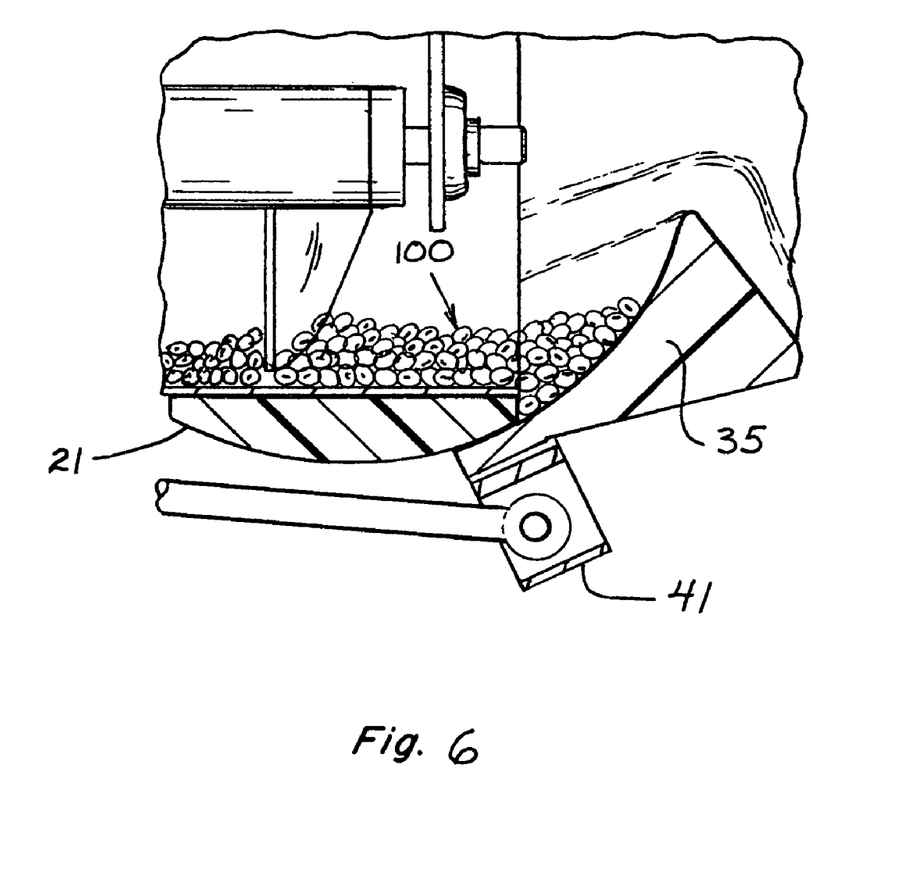
FIG. 6 is a partially cutaway side view of the interface between the boot and the distal end of the unloading auger tube at the "grain save" position, showing how the dam impingement prevents soybeans from inadvertent spilling or dribbling out of the boot.

FIG. 6 illustrates a close-up view of dam impingement 35 as it inhibits spillage of, for example, soybeans 100.

Figure 7:
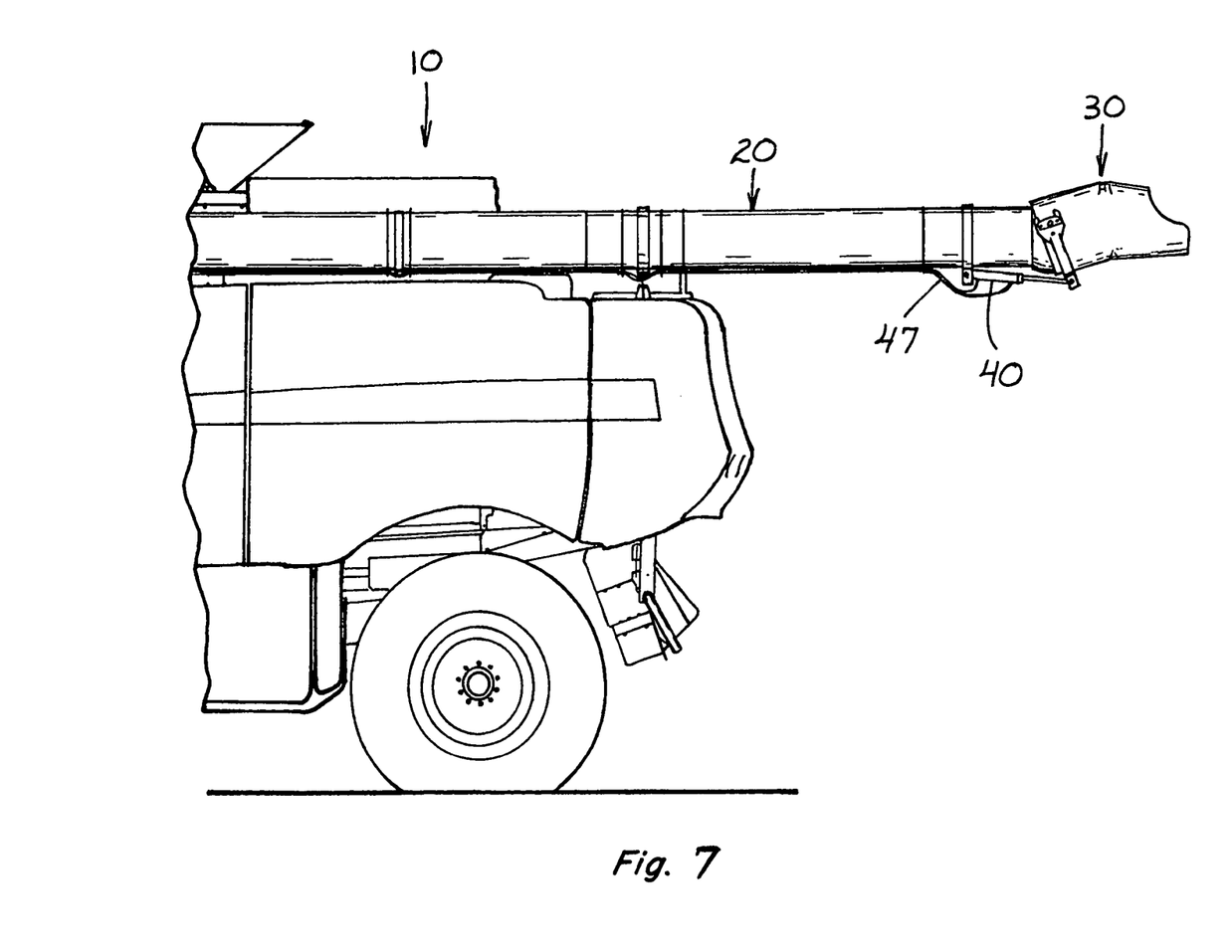
FIG. 7 is a right side elevation of the rear of and the unloading auger tube of the present invention in longitudinal relationship to its combine harvester and the boot is in the "grain save" (G) position.

In FIG. 7, auger 22 has been shutoff at input device A (51) at FIG. 2 and by input device B (53) at FIG. 2, and the auger tube 20 has been moved to its storage position, longitudinally parallel to the length and direction of combine 10. By way of signals through conduit 47, linkage 40 has moved boot 30 into the "grain save" position.

In operation, the pivoting discharge boot 30 can be pneumatically, hydraulically, or preferably electronically controlled by an operator within cab 11 by input devices 51 and 53 through controller 50. The method provided by boot 30 will entail, generally, although not being limited to, three principle steps:

(1) When the operator engages or turns on the auger 22, the tube begins unloading grain 100, and simultaneously, or just prior thereto, the boot 30 will automatically pivot down from the "grain save" (G) position to the "nominal" (N) operating position.

(2) While the auger tube 20 is unloading grain 100 into, for example, truck 60, the operator is able to adjust the positions of the discharge boot 30 up and down through an infinite number of angles ranging from the "nominal" (N) position to the (D) position or "deep" angle position or if desired upwards towards the "grain save" (G) position. The "deep" angle (D) position is programmed as the stop point, i.e. the steepest angle to which the boot will be allowed to pivot. That angle can vary depending upon a number of factors including, for example, the length of tube, the size of combine 10 and other design factors. A deep angle of 35° below horizontal may be desirable in some operations, while a "nominal" angle of 25-30° below horizontal may be suitable in such designs. The "grain save" position may be, for example, 15° above horizontal.

(3) Once the unloading function is disengaged, auger 22 ceases its rotation, and boot 30 instantly returns to (G) position. Tube 20 can be returned to its storage position.

In light of all the foregoing, it should thus be apparent to those skilled in the art that there has been shown and described a directable discharge boot assembly for a combine harvester's unloading auger tube. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A directable discharge boot assembly for an unloading auger tube of an agricultural combine, comprising:
   a hollow boot including an inner surface having an open interface portion having a partial circular profile shape when viewed from a sideward direction, and an open spout extending angularly from the open interface portion, a lower portion of the open interface portion comprising a dam impingement extending upwardly adjacent to the spout portion; and
   an element disposed about an open distal end of the auger tube and including an outer surface having a partial circular profile shape when viewed from a sideward direction, the interface portion of the inner surface of the boot being disposed in mating pivoting relation with the outer surface such that the boot is pivotable thereabout through a range of positions including at least one operating position extending downwardly from the open distal end for allowing free flow of grain therefrom, and a grain save position wherein the dam impingement extends upwardly and outwardly above at least a lower portion of the open distal end of the auger tube for preventing dribbling of grain therefrom.

2. The assembly of claim 1, further comprising an actuator connected between the unloading auger tube and the boot assembly, the actuator being controllably operable for pivoting the boot assembly through the range of positions.

3. The assembly of claim 2, further comprising an input device at another location and connected in operative control of the actuator and an unloading auger located in the tube, the input device being operable for automatically controlling the actuator to move the boot from the grain save position to a nominal operating position in the range when or just after engaging or turning on the unloading auger, and to automatically control the actuator to move the boot from any of the positions in the range to the grain save position when turning off or disengaging the auger.

4. The assembly of claim 3 wherein the input device is operable for controlling the actuator for moving the boot up or down through an infinite number of operating positions within the range.

5. The assembly of claim 1, wherein the interface portion, including the dam impingement, and the element disposed about the distal end of the auger tube, comprise a spherical joint, such that when the boot is in the grain save position the dam impingement will bound and define a partial spherical shaped cavity outwardly of the open distal end of the auger tube, and when the boot is in the operating position the dam impingement will be located below the distal end.

6. A method for unloading grain from a combine harvester through an auger tube thereof containing a helical auger rotatable for discharging grain through an open distal end of the tube, comprising steps of:
   providing a directable boot assembly mounted on the open distal end of the tube, the boot assembly including a hollow boot having a spout extending outwardly from an interface portion mounted for upward and downward pivotal movement about the distal end between a grain save position wherein the spout will extend outwardly and upwardly from the open distal end, and at least one operating position wherein the spout will extend outwardly and downwardly from the open distal end, the interface portion comprising an upwardly facing inner surface disposed to slidably engage a mating downwardly facing outer surface on the distal end when the boot is pivoted;
   providing an actuator controllably operable for pivoting the boot between the grain save position and the at least one operating position responsive to signals from an input device; and
   operating the actuator to move the boot to the grain save position such that the inner surface of the interface portion will extend upwardly from the downwardly facing outer surface outwardly of a lower portion of the open distal end for preventing dribbling of grain therefrom.

7. The method of claim 6, comprising a step of operating the actuator to move the boot to one of the operating positions such that the inner surface of the interface portion will at least substantially underlay the downwardly facing outer surface and the spout will extend downwardly and outwardly from the open distal end to allow free flow of grain therefrom.

8. The method of claim 6, wherein the input device is configured for controlling operation of the auger simultaneously with the operation of the actuator, such that the step of operating the actuator to move the boot to the grain save position will also operate to turn off or disengage the auger.

9. The method of claim 6, wherein the upwardly facing inner surface of the interface portion of the boot and the downwardly facing outer surface on the distal end of the tube comprise mating portions of a spherical joint connecting the boot to the tube.

10. A directable discharge boot assembly for an unloading auger tube of an agricultural combine, comprising:
    an element disposed about an open distal end of the auger tube and having a partial spherical shaped outer surface; and
    a hollow boot including an open interface portion having a partial spherical shaped inner surface matingly disposed about the partial spherical shaped outer surface of the element, forming a spherical joint therewith, and an open spout extending angularly from the open interface portion, a lower portion of the open interface portion comprising a dam impingement extending upwardly from the spout portion, the boot being pivotable about the distal end of the tube through a range of positions including at least one operating position wherein the spout extends downwardly from the distal end and the dam impingement is disposed beneath and in mating relation to the element so as to allow free flow of grain from the distal end, and a grain save position wherein the dam impingement extends upwardly and outwardly in relation to at least a lower portion of the distal end for preventing dribbling of grain therefrom.

11. The assembly of claim 10, further comprising an actuator connected between the unloading auger tube and the boot assembly, the actuator being controllably operable for pivoting the boot assembly through the range of positions.

12. The assembly of claim 11, further comprising an input device at another location and connected in operative control of the actuator and an unloading auger in the tube, the input device being operable for automatically controlling the actuator to move the boot from the grain save position to a nominal operating position in the range when or just after engaging or turning on the unloading auger, and to automatically control the actuator to move the boot from any of the positions in the range to the grain save position when turning off or disengaging the auger.

13. The assembly of claim 12, wherein the input device is operable for controlling the actuator for moving the boot up or down through an infinite number of operating positions within the range.

14. The assembly of claim 10, wherein the dam impingement bounds and defines a partial spherical shaped cavity outwardly of the distal end of the auger tube when the boot is in the grain save position.

* * * * *